2,512,036

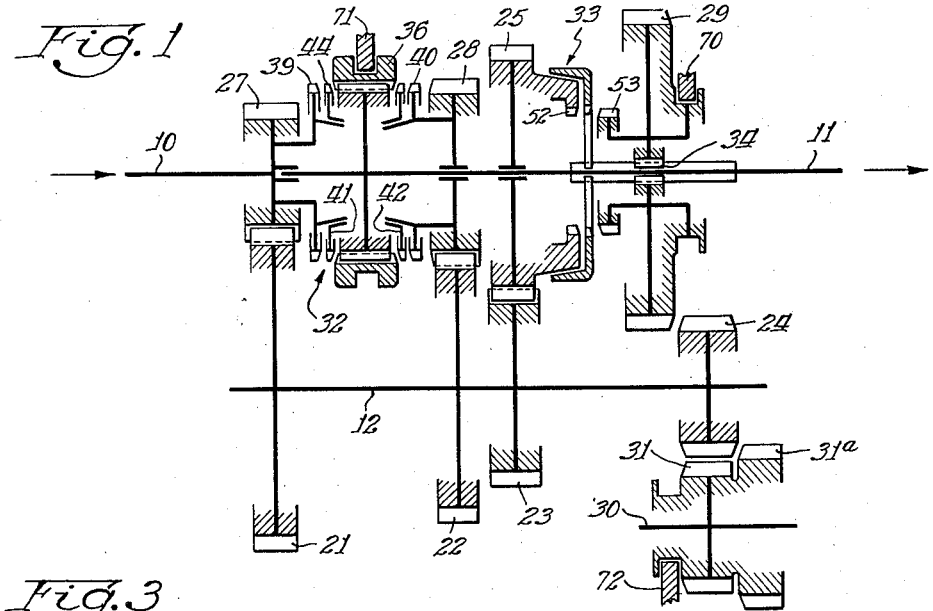

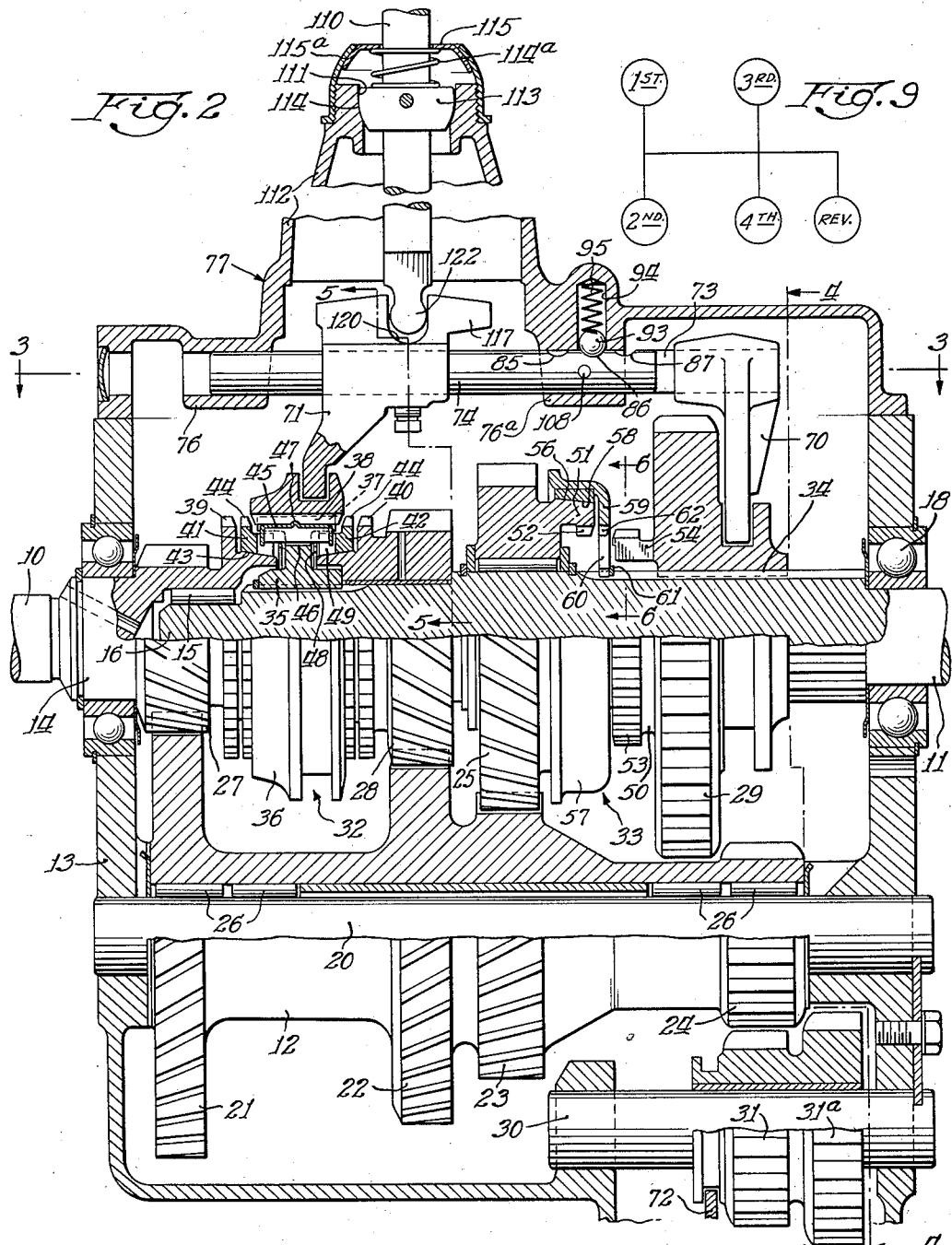

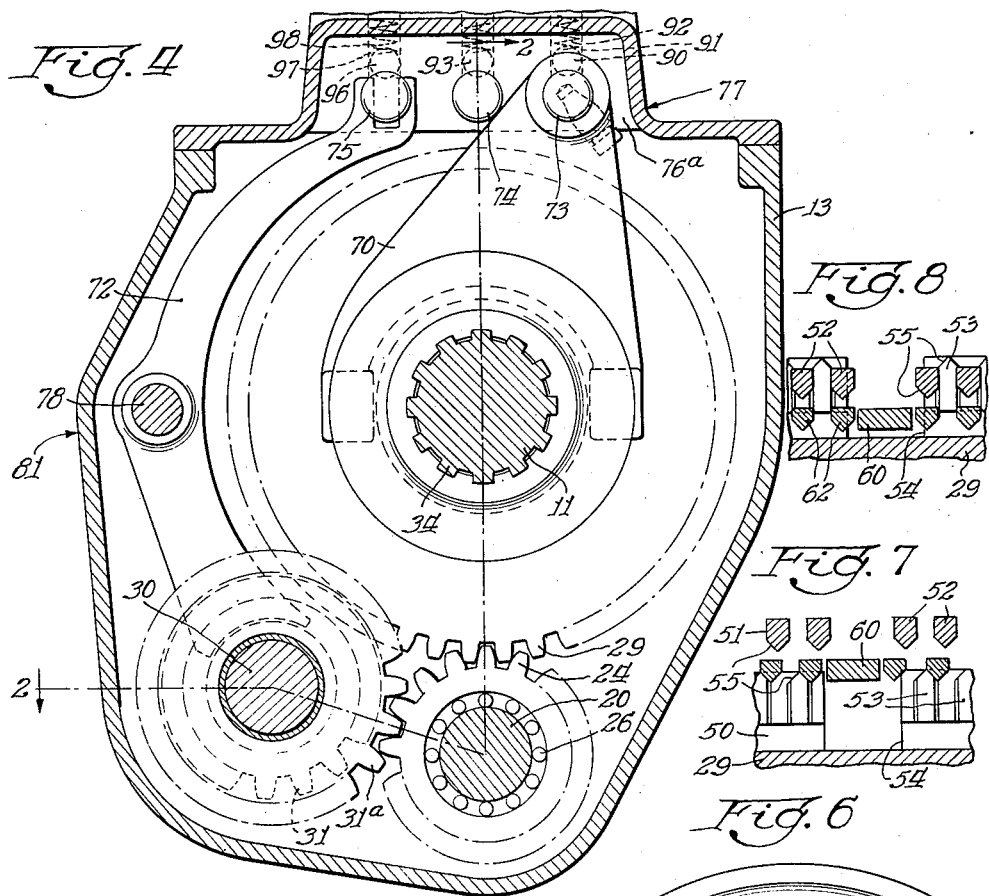
Fig. 4
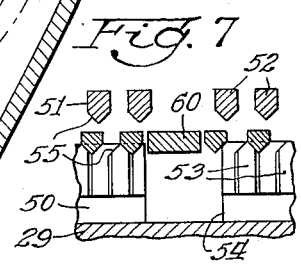
Fig. 8
Fig. 7
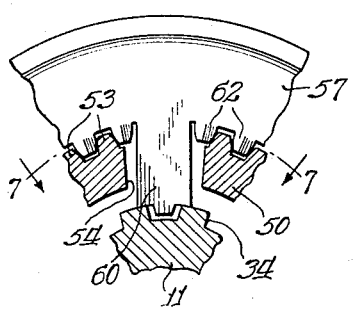
Fig. 6
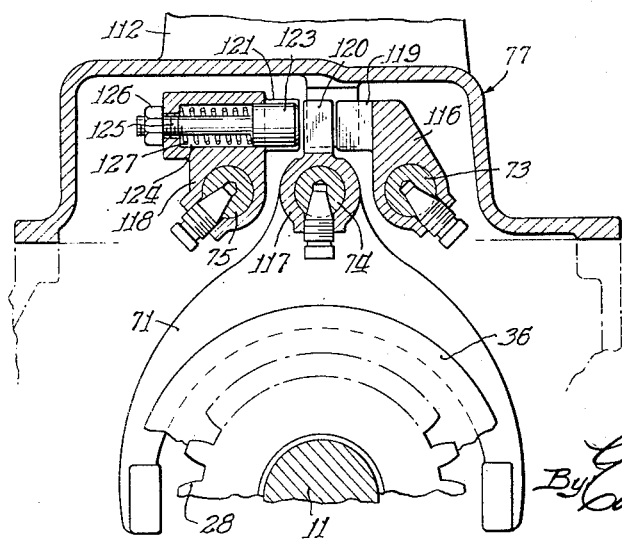
Fig. 5
Inventor:
Palmer Orr Patented June 20, 1950

UNITED STATES PATENT OFFICE 2,512,036

TRANSMISSION

Palmer Orr, Muncie, Ind., assignor to Borg-Warner Corporation, Chicago, Ill., a corporation of Illinois Application May 22, 1947, Serial No. 749,858

1 Claim. (Cl. 74—333)

This invention relates to change-speed transmissions and has as its general object to provide a transmission of the countershaft type for motor vehicles.

Another object of the invention is to provide an improved change-speed transmission of the type indicated and which will provide for variations in the speed of the drive in a forward direction and a reverse drive, yet which is axially compact.

A further object of the invention is to provide a four-speed transmission employing a minimum number of gears and which is simple and compact in construction and arrangement of parts and quiet in operation.

My invention contemplates the provision of a novel transmission having four forward speeds and reverse drive and wherein synchronizers are used with constant mesh gears for effecting second, third and fourth speeds and shiftable gears are instrumental for establishing low speed and reverse drives, the constant mesh gears having helical teeth to insure quiet operation of the transmission and the shiftable low-speed and reverse gears having spur teeth to permit easy intermeshing engagement of the gears in the initiation of these drives from a normally inoperative condition of the transmission.

Other objects, the advantages and uses of the invention will become more apparent after reading the following specification and claim, and after considering the drawings forming a part of the specification and wherein:

Fig. 1 is a longitudinal sectional view drawn diagrammatically of my novel transmission;

Fig. 2 is a sectional view of the transmission which is taken on the line 2—2 of Fig. 4;

Fig. 3 is a sectional view of the gear shifting arrangement of the transmission and which is taken on line 3—3 of Fig. 2;

Fig. 4 is a sectional view taken along the line 4—4 of Fig. 2;

Fig. 5 is a sectional view taken along the line 5—5 of Fig. 2;

Fig. 6 is a sectional view taken along the line 6—6 of Fig. 2 and illustrating the friction and positive clutch arrangement of a synchronizing mechanism of the transmission;

Fig. 7 is a fragmentary view illustrating schematically the position of the friction and positive clutch arrangement of Fig. 6 when the power transmitting members are in a synchronous rotation, said view being taken on line 7—7 of Fig. 6;

Fig. 8 is a fragmentary view illustrating schematically the same parts in the intermeshing position of the positive clutch elements when the transmission members are in synchronous rotation; and Fig. 9 is a diagrammatic view showing the path the shift lever takes to obtain the various gear ratios and neutral.

Like characters of reference designate like parts in the several views.

Referring now to the figures of the drawings, the illustrated transmission may be seen to comprise an input shaft 10, an output shaft 11 and a countershaft 12 mounted in a housing or casing 13. The front wall of the housing carries a suitable bearing for the enlarged end 14 of the driving shaft 10, which may be the vehicle clutch shaft, driven from an engine through conventional clutch mechanism, not shown. The enlarged end 14 of the shaft 10 is formed with an axial recess for the reception of roller bearing means 15 in which the reduced forward end 16 of the output shaft 11 is journaled. The rear end of the output shaft 11 is journaled in a bearing 18 supported in the rear wall of the housing 13. The countershaft 12 comprises the gear cluster in the form of a hollow spool mounted to rotate on its arbor 20 supported at its ends by the front and rear walls of the transmission casing. The hollow spool 12 comprises a gear cluster being formed with a number of integral gears 21, 22, 23 and 24 and is rotatably mounted on said arbor 20 by means of the roller bearings 26, 26. The gear 21 is in constant mesh with a gear or pinion 27 formed on the enlarged end 14 of the shaft 10, so that the countershaft 12 is constantly connected to and driven from the shaft 10 in well-known manner. The gear 22 is also constantly in mesh with a gear 28 which is mounted for rotation relative to the output shaft 11. The gear 23 is in constant mesh with a gear 25 rotatably mounted on the shaft 11. Gear 24 of the cluster is adapted to engage with a gear 29 splined to the shaft 11 and movable axially thereof into engagement with the gear 24. Mounted in the casing 13 is a short idler or second countershaft 30 on which is journaled idler gears 31 and 31a, the gears being connected to rotate together. Gear 31 meshes with gear 29 and gear 31a meshes with gear 24 of the gear cluster 12.

Positive clutch mechanism 32 is provided for connecting either the gear 27 or the gear 28 with the output shaft 11, and positive clutch mechanism 33 is provided for connecting the gear 25 to the gear 29 splined on the output shaft 11 as indicated at 34 for rotative movement therewith and axial sliding movement relative thereto. The clutch mechanism 32 comprises a hub 35 fixed to the shaft 11 and a collar 36 slidably disposed on the hub. The hub 35 is provided with teeth 37 on its periphery which are in mesh with teeth 38 formed on the internal surface of the collar 36. Teeth 39 and 40 are provided respectively on the gear 27 and 28, and the collar 36 is movable from its neutral position in which it is shown in the drawings either to bring its teeth 38 into mesh with the teeth 39 in one position or to bring its teeth 38 into mesh with the teeth 40 in another position. In the former position, the engaging teeth 38 and 39 function to connect the shaft 10 and 11 through the collar 36 and hub 35 and in the latter position the teeth 38 and 40 function to connect the gear 28 with the shaft 11 through the collar and hub.

A blocker synchronizing ring 41 is provided between the hub 35 and the teeth 39, and a similar ring 42 is provided between the hub and the teeth 40. These rings are adapted to bear on friction surfaces 43 provided on the shaft 10 and on the gear 28 adjacent the hub 35, as shown. The rings 41 and 42 each are provided with blocker teeth 44 which function to block the movement of the teeth 38 on the collar 36 when the teeth 44 are in the path of movement of the teeth 38. The synchronizing rings 41 and 42 are acted on by thrust bars 45 disposed in suitable slots 46 in the periphery of the hub 35. Each of the thrust bars is provided with a projection 47 which fits in a suitable internal groove in the collar 36 in the neutral condition of the clutch mechanism in which it is illustrated, and springs 48 acting on the thrust bars 45 yieldably hold the thrust bars with their projections within this groove. Each of the rings 41 and 42 is provided with a slot 49 receiving an end of a thrust bar 45, and the slots are of such width that the synchronizer ring may have a limited rotary movement with respect to the thrust bars. At the limit of the movement between one of the synchronizing rings and the thrust bars, the teeth 44 of the rings function to block movement of the collar 36 toward an engaged position. The synchronizer rings 41 and 42 function due to their frictional contact with the tapered surfaces 43 to synchronize the speed between the collar 36 and either the shaft 10 or the gear 28 prior to engagement of the collar either with the gear teeth 39 or the teeth 40. The thrust bars 45 function to transmit force from the collar 36 to either of the rings 41 or 42 to provide the synchronizing force between either of the rings and the corresponding tapered surface 43. The teeth 44 on each of the rings function to prevent a complete movement of the collar 36 to engaged position until the speed of the teeth to be engaged are synchronized with the collar and there is a slight reversal of relative rotation whereby the synchronizer ring and the teeth 44 are rotated partly to move the teeth 44 out of the path of movement of the teeth 38 of the collar 36. The projections 47 of the thrust members 45 are moved out of the internal groove in the collar 36 against the action of the springs 48 when the collar 36 moves into either of its fully engaged positions. As is apparent from an inspection of the construction, the force exerted on the rings 41 and 42 from the collar 36 for synchronizing the engaging parts of the positive clutch is transmitted through the projections 47, and when these projections move out of the internal groove in the collar 36, the thrust bars do not thereafter exert synchronizing force on the synchronizer rings. The construction and operation of the clutch mechanism 32 is believed clear from the above explanation; however, the patent to S. O. White et al., No. 2,221,900, issued November 19, 1940 may be referred to for a more full description of the synchronizer and blocker clutch mechanism.

The clutch mechanism 33 for connecting the gear 29 to the output shaft 11 comprises a positive dog or tooth clutch element 50 rigidly secured to the side of the gear 29 and a positive cooperating dog or tooth clutch element 51 rigid with and extending laterally from the gear 25 rotatably mounted on the output shaft 11. The clutch member 51 is equipped with internal gear-like teeth 52, while clutch element 50 is provided with counter-part external teeth 53 adapted to fit within the cavity of clutch element 51 with its clutch teeth 53 interlocking with the internal clutch teeth 52. When said clutch elements 50 and 51 are so interlocked, conditions are established for driving the gear 25 from the gear 23 whereby the gear 25 will effect rotation of the gear 29 and the output shaft 11. As shown in Fig. 6, the teeth 53 are not continuous around the clutch element 50, but are arranged symmetrically in a plurality of segmental batteries or groups separated by grooves or spaces 54. The clutch teeth 52 and 53 are preferably relatively fine and numerous, and their leading ends are double inclined or tapered as at 55 to provide for intermeshing with as little clashing as possible. Clutch element 51 is formed with an exterior convex conical friction clutch surface 56. A friction clutch element 57, which is illustrated as a friction clutch drum, is provided with an internal conical friction surface 58 adapted to be engaged frictionally with the conical surface 56 of the clutch element 51. The clutch drum 57 may have a bronze clutch shoe on which the internal conical surface 58 is formed and the drum may be pressed from sheet steel with a flat bottom 59, the central portion of which is removed to form a central opening so that the drum may engage over and surround the splined shaft 11. The drum is provided with one or more radial lugs 60 extending inward from the periphery of the central opening and entering into one or more of the grooves between the lands of the splined shaft. Lugs 60 are of less circumferential extent than said grooves, as shown in Fig. 6, and provide for a positive driving connection between the splined shaft 11 and the clutch drum and also for a limited relative rotary or angular movement. The radial lugs 60 are disposed between the spaces between the groups or batteries of teeth in the toothed coupling element 50, and the portions of the drum between the lugs 60 are formed with internal tapered teeth 62 adapted to mesh with teeth 53 on the clutch element 50 on axial movement of the gear 29. Because of the described construction of the drum, the batteries of teeth 53 may pass between the radial lugs 60 to engage the teeth 62 of the drum and thereafter to engage the companion teeth of the other clutch element 51 when synchronous speeds of the two clutch elements have been attained.

The clutch drum 57 may have a limited axial movement sufficient to permit the conical friction surfaces to be pressed into driving engagement and be released. This movement is preferably very slight as it is desirable to have the internal conical friction surface of the drum ride on the oily external cooperating conical surface of the mating element when the clutch element 50 is in neutral for a reason that will presently appear. A stop ring 61 limits the retreat of said drum from inter-engaging position so that the conical surfaces separate only far enough to allow them to ride one on the other with an oil film in between.

The ends of the teeth 53 of the clutch element 50 are preferably substantially parallel, when in contact with the inclined end faces of the adjacent teeth 62 of the drum to co-act with these teeth, so that if the gear 29 is forced axially into contact with the drum, the force acting axially will be resolved into two forces on the drum, one of which is tangential to the circle in which the drum revolves. The extent of rotary movement relative to the splined shaft of which the drum 57 is capable is sufficient to bring the teeth 62 thereon and the teeth 53 of the element 50 into axial alignment when the drum is at one or the other extremities of its said relative rotary movement. As long as there is any differential rotation between the shaft 11 and the shaft 10, or between the shaft 11 and the gear 25, the drum inasmuch as it is always in frictional contact with gear 29 by reason of the oil film between the mating conical surfaces, will be dragged to one extremity or the other of its possible rotary movement on the spline shaft 11 so that upon axial movement of the gear 29 under such conditions, an axial thrust upon the clutch element 50 will press the friction surface of the drum 57 into firm contact with its companion friction surface 56 on the element 51. Upon axial movement of the gear 29 and the clutch element 50, the inclined surfaces on the teeth 62 of the drum will be forced axially against the corresponding surfaces 55 of the teeth of the clutch element 50. The force applied to oppose further advance of the clutch element 50 toward intermeshing position will then depend upon the tangential force due to the inertia of the gear 28, the counter shaft gears, and the input shaft 10. If this force is greater than the operator can overcome he cannot intermesh the two clutch elements. The pressure he applies in endeavoring to overcome tangential force presses the friction elements together; when the pressure is sufficient to bring the gear 25 and the output shaft 11 substantially to equal speeds the tangential force disappears and continued pressure upon the gear 29 can then displace circumferentially the gear 25 and its element 51 owing to the inclination of the teeth surfaces, permitting the teeth of the positive clutch elements to slide together, as shown in Fig. 8. The construction and operation of the clutch mechanism 33 is believed clear from the above explanation; however, the patent to G. A. Thompson, No. 2,022,095, issued November 26, 1935, may be referred to for a more full description of the synchronizer and blocker clutch mechanism.

Four speeds in forward drive and a single speed in reverse drive are provided by the illustrated transmission. Low speed forward drive is provided by moving gear 29 axially of the shaft 11 to engage its teeth with the teeth of the gear 24 of the countershaft gear cluster. The drive is then from the drive shaft 10 through the gears 27 and 21 and the gears 24 and 29 to the driven shaft 11. Second speed in forward drive is provided by moving gear 29 axially of the shaft 11 to engage the teeth 53 of its clutch element 50 with the teeth 52 of the clutch element 51 of the gear 25 to thereby connect gear 25 in driving relation with the shaft 11. It may be noted that the gear 25 is in constant mesh with the gear 23 of the countershaft which is constantly rotated during forward drive through the transmission, and due to the difference of the diameters of the meshing gears 23 and 25 and the rotation of the meshing gears 24 and 29 in first speed, the gear 25 will be rotated at a speed different than the gear 29 in first speed so that it is desirable to afford a synchronizing mechanism between first and second speed drives in order to synchronize the speed of the gears 29 and 25 prior to the engagement of their clutch elements for second speed to avoid clashing. The power train in second speed is from the drive shaft 10 through the gears 27 and 21 and through the gears 23 and 25 and the clutch mechanism 33 and gear 29 to the driven shaft 11. Third speed forward drive is provided by moving the clutch collar 36 to the right (Fig. 2) to engage it with the teeth 40, the clutch mechanism 33 being disengaged. The drive in third speed forward is from the shaft 10 and through the gears 27 and 21 and through the gears 22 and 28, the clutch mechanism 32 to the driven shaft 11. Fourth speed forward drive constitutes a direct drive between the shaft 10 and 11 is completed by moving the clutch collar 36 to the left into engagement with the teeth 39. Reverse drive is obtained by shifting the clutch mechanisms 32 and 33 to neutral condition and thereafter shifting the gear cluster including the reverse idler 31 into mesh with the gear 29 and the gear 31a into mesh with the gear 24 of the countershaft gear cluster. In reverse drive, the power train proceeds from the drive shaft 10 through the gears 27 and 21, the gear 24, the gear 31a and the associated gear 31 which is in mesh with the gear 29 and then to the driven shaft 11.

It may be noted from a consideration of Fig. 2 that the pairs of constant mesh gears 21—27, 22—28 and 23—25, are formed with helical teeth which are instrumental in insuring quiet operation of the transmission and that the gears 24, 29, 31 and 31a are provided with spur teeth so that intermeshing of the teeth of the slidable gears with the other of these gears in establishing low speed and reverse drive is obtained with a minimum of effort by the driver.

The mechanism for shifting the clutch sleeve 36, the gear 29, and the gears 31 and 31a for conditioning the transmission for the various forward speed ratios and reverse drive will now be described. Yokes 70, 71 and 72 are provided and which fit respectively into suitable grooves formed in the gear 29, the sleeve 36 and the idler gear set 31 and 31a so that the yokes may shift these parts. The yokes 70, 71 and 72 are respectively fixed to shafts 73, 74 and 75, and these shafts are slidably disposed in space walls 76 and 76a in the transmission case cover generally designated 77 as will be apparent from an inspection of Figs. 3 and 4. As shown in Figs. 3 and 4, the shift yoke 72 for effecting reverse drive is slidably mounted on a relatively short rigid shaft 78 having opposite ends thereof fixed in the end walls 79 and 80 of a portion generally designated 81 of the transmission housing 13 extended laterally as shown in Fig. 3 to accommodate and to provide for the support of the shaft 78.

Ball locking and detent means are provided for controlling the motion of the shafts 73, 74 and 75. The shaft 73 is provided with three notches 82, 83 and 84; the shaft 74 is provided with three notches 85, 86, 87; and the shaft 75 is provided with two notches 88 and 89. The notches 82, 83 and 84 are adapted to cooperate with a ball 90 slidably disposed in a cylindrical cavity 91 provided in the wall 76a. The ball 90 is acted on by a spring 92 disposed in the cavity 91 and held in place therein. The notches 85, 86 and 87 are adapted to cooperate with a ball 93 which is disposed in another cavity 94 in the wall 76a of the case cover 77 and which is acted on by a spring 95. A ball 96 is provided for cooperating with the notches 88 and 89, and the ball 96 is disposed in another cylindrical cavity 97 in said wall of the case cover 77, said ball 96 being acted on by a spring 98. The balls 90, 93 and 96 all act similarly with respect to their respective notches in the shafts 73, 74 and 75 and function as detent means for yieldably holding the shaft in a number of differential positions.

The notches 82, 83 and 84 in the rail 73 are so disposed thereon that the ball 90 when in the notches function to yieldably hold the gear 29 respectively in its first or low speed drive position wherein the gear 29 meshes with the gear 24, in neutral position in which the gear is illustrated, or in second speed position in which the clutch teeth 53 of the clutch element 50 connected to the gear are in mesh with the teeth 52 of the clutch element 51 connected to the gear 25. The notches 85, 86 and 87 are so disposed on the shift rail 74 that the ball 93 when in the notches functions to yieldably hold the clutch sleeve 36 respectively in its third speed position in which the sleeve is in engagement with the teeth 40, in neutral position in which the sleeve is illustrated, or in the direct drive position of the sleeve in which it is engaged with the teeth 39. The notches 88 and 89 in the shaft 75 are so disposed in said shaft that the ball 96 functions respectively to yieldably hold the idler gears 31 and 31a either in their neutral positions in which they are illustrated or in their reverse speed positions in which they are engaged with the gears 24 and 29.

The mechanism for locking the rails 73, 74 and 75 against movement under certain conditions comprises a notch 100 formed in the rail 73; notches 101 and 102 formed in the rail 74, and a notch 103 formed in the rail 75 and an interlocked element or bean 104 is provided in a cylindrical cavity 105 extending between the notches 100 and 101, and another interlock element 106 is provided in a cylindrical cavity 107 extending between the notches 102 and 103. A pin 108 is slidably disclosed in the rail 74 and extends between the slots 101 and 102.

It will be noted that, in the drawings, the rails 73, 74 and 75 are illustrated in their neutral positions, and the notches 100 to 103 inclusive are all in line with each other and with the interlock elements 104 and 106 and pin 108 in these positions of the rails. The interlock elements 104 and 106 and the pin 108 function to prevent a movement of two of the rails out of their neutral positions when a third rail is moved out of neutral position. This locking mechanism thus functions to prevent a conditioning of the transmission into more than one speed ratio at a time. In the form chosen for illustration, the interlock elements 104 and 106 each comprise the usual beans and referring to Fig. 3, each interlock element 104 and 106 is of such length that when the interlock element 104 is seated in one of the notches, notch 101 for example, its opposite end is able to ride out of the opposite notch 100 and on the outer surface of the rail 73, the element 104 thereby being urged into the notch 101 in the rail 74 and to move the pin 108 and thereby the element 106 into the notch 103 in the rail 75, whereby the rails 74 and 75 will be prevented from moving. Similarly the interlock provided between the shafts 74 and 75 is such that when the interlock element 106 is disposed in the notch 102 in the rail 74 to prevent movement of said rail, the other end will be disposed out of the opposite notch in the rail 103 and will ride upon the surface of the latter rail to permit shifting movement thereof, this movement of the element 106 moving the pin 108 which actuates the element 104 into the notch 100 in the rail 73 to prevent shifting movement thereof. To prevent shifting movement of the rails 73 and 75 during that of the rail 74, the shifting of the rail 74 will cause the elements 104 and 106 to be moved into the notches 100 and 103 respectively, in the rails 73 and 75 to restrain the latter rails 73 and 75.

To actuate the gear shift rails 73, 74, 75, to obtain the different forward speed ratios and reverse drive, a gear shift lever 110 is mounted for universal movement in a socket 111 provided in a hollow conical upstanding pedestal or riser 112 of the transmission case cover 77. The lever 110 is provided with a ball 113 in spherical engagement as at 114 with the wall of the socket 111 and is urged against said wall by a spring 114a having one end seated against the ball and its other end abutting a plate 115 having a peripheral flange in spherical engagement as at 115a with the upper end of the riser 112, the aforesaid arrangement universally mounting the lever 110 in the transmission case cover 77. The lower end of the lever 110 is adapted to cooperate with suitable blocks or arms 116, 117, 118 secured to the rails 73, 74 and 75 and having notches at 119, 120 and 121 therein, normally arranged in alignment for coacting with the finger 122 at the end of the lever 110. It will be apparent that the lever 110 may have lateral movement for selecting a desired rail to be shifted and also a selecting fore-and-aft movement for shifting the selected rail.

Referring to Figs. 3 and 5, it will be observed that when finger 122 of lever 110 engages in notch 120 for shifting the rail 74, the third and fourth speeds may be obtained as previously related. In such position, the lever 110 is adapted to be thrust against a spring pressed plunger 123 slidably mounted in a cylindrical cavity 124 in the block 118 fixed to shift rail 74 and extending into the notch 121 in said block. It may be noted that the plunger 123 is of piston-like form with the reduced portion 125 thereof extending through the rear wall of the cavity 124 and having threaded adjustable relation with the nut 126 to position the plunger head by the action of the spring 127 in a desired position with respect to the notch 121 and the finger 122 of lever 110. The purpose of such spring pressed plunger 123 is to indicate to the operator when the transmission is being shifted to reverse drive position as the resistance which such spring pressed plunger offers against the finger 122 of lever 110 requires more effort on the part of the operator to shift into reverse drive position than into the forward speed ratio positions.

My invention provides a very satisfactory four-speed transmission wherein direct drive and third and second speeds can all be introduced on "synchro-mesh" principles, low or first speed being obtained by means of a sliding member, shown in the drawing in the form of a sliding gear, without the use of any synchro-mesh feature, as a change down to this speed while the car is moving is, in practice, seldom necessary.

While I have described my invention in connection with one specific embodiment thereof it is to be understood that this is by way of illustration and not by way of limitation and the scope of my invention is defined solely by the appended claim which should be construed as broadly as the prior art will permit.

I claim:

In a transmission, a casing, aligned driving and driven shafts mounted in said casing, a countershaft mounted in said casing, a plurality of gear trains including, in the order named, a first gear train for transmitting a drive from said driving shaft to said countershaft and second, third and fourth gear trains for transmitting forward drives of varying speed ratios from the countershaft to the driven shaft, clutch means interposed between the first and second gear trains and including a clutch sleeve connected to and shiftable axially of said driven shaft selectively engageable with clutch elements respectively connected to the drive shaft and to a gear of the second gear train, means for shifting said clutch sleeve and including a shift rail connected to said clutch sleeve, said third gear train comprising a gear axially fixed and rotatable on said driven shaft and said fourth gear train comprising an axially shiftable gear drivingly mounted on said driven shaft, coupling elements respectively driven from said gears and adapted to drivingly connect said gears in response to shift of said axially shiftable gear, means for shifting said axially shiftable gear to connect said shiftable gear with said fixed gear of the third gear train or into meshing engagement with a countershaft gear for selectively connecting the driven shaft to the third gear train or to the fourth gear train and including a shift rail connected to said shiftable gear, means for rotating said driven shaft in a direction reverse to the direction of rotation of said drive shaft including a reverse gear cluster comprising an idler shaft, a pair of gears loosely mounted on said idler shaft and shiftable into mesh with said shiftable gear and the countershaft gear of said fourth gear train, and means for shifting said reverse gear cluster including a shift rail connected to said cluster, said shift rails being slidably mounted in a horizontal plane in spaced walls in said casing with said rail for shifting said clutch sleeve being disposed between said rail for shifting said axially shiftable gear and said rail for shifting said gear cluster, each of said rails having a neutral position, and an interlock device positively restraining shifting of two of said rails from their neutral positions upon shifting of the other of said rails to establish one of said forward drives or said reverse drive and comprising two bean-like elements slidably carried in an elongate passage formed in one of said walls and extending transversely of said rails, one of said elements being disposed between said gear-shifting rail and said clutch sleeve-shifting rail and the other element being between said gear cluster-shifting rail and said clutch sleeve-shifting rail, each of said gear and gear cluster-shifting rails having a notch therein adapted to receive the adjacent element and said clutch sleeve-shifting rail having notches in opposite sides thereof receiving one or the other of said bean-like elements, under certain conditions, a pin slidably carried by said clutch sleeve-shifting rail and having its opposite ends extending into the notches therein and abutting said elements, a manually operable gear shift lever projecting into said casing from the exterior thereof, means pivotally mounting said gear shift lever in said casing at a point medially of its ends for universal swinging movements, a block secured to each of said shift rails, there being a notch formed in each of said blocks designed for selective reception of an end of said gear shift lever therein, the block carried by the shift rail which is connected to the reverse gear cluster being formed with a bore therein communicating with the notch in said latter block, a piston-like blocking element slidably disposed in said bore and extending into said latter notch, and yieldable means normally urging said piston-like element to a position wherein it yieldingly blocks entry of the end of said gear shift lever into the notch into which it extends whereby a greater manual effort on the part of an operator is required to move said gear shift lever so that the end thereof enters said last-mentioned notch than is required to move said gear shift lever so that its end enters either of said other notches.

PALMER ORR.

REFERENCES CITED

The following references are of record in the file of this patent:

UNITED STATES PATENTS

| Number | Name | Date |
| --- | --- | --- |
| 1,564,719 | Sponable | Dec. 8, 1925 |
| 1,973,807 | Grinham et al. | Sept. 18, 1934 |
| 2,015,736 | Vandervoort | Oct. 1, 1935 |
| 2,193,672 | Dolza | Mar. 12, 1940 |
| 2,256,320 | Lapsley | Sept. 16, 1941 |
| 2,300,036 | Peterson | Oct. 27, 1942 |
| 2,368,868 | Orr | Feb. 6, 1945 |
| 2,428,892 | Plexico | Oct. 14, 1947 |

FOREIGN PATENTS

| Number | Country | Date |
| --- | --- | --- |
| 405,214 | Great Britain | Feb. 1, 1934 |
| 190,669 | Germany | Oct. 30, 1907 |

OTHER REFERENCES

Publication, Automobile Engineer, issue of November 21, 1946, pages 535-538.